United States Patent
Yamasaki

(10) Patent No.: US 10,760,027 B2
(45) Date of Patent: Sep. 1, 2020

(54) SLIDING MEMBER HAVING COATING FILM AND METHOD FOR FORMING COATING FILM

(71) Applicant: NOK Klueber Co., Ltd., Tokyo (JP)

(72) Inventor: Yujiro Yamasaki, Ibaraki (JP)

(73) Assignee: NOK KLUEBER CO., LTD. (JP)

( * ) Notice: Subject to any disclaimer, the term of this patent is extended or adjusted under 35 U.S.C. 154(b) by 292 days.

(21) Appl. No.: 15/310,236

(22) PCT Filed: Apr. 30, 2015

(86) PCT No.: PCT/JP2015/063026
§ 371 (c)(1),
(2) Date: Nov. 10, 2016

(87) PCT Pub. No.: WO2015/174292
PCT Pub. Date: Nov. 19, 2015

(65) Prior Publication Data
US 2017/0211006 A1    Jul. 27, 2017

(30) Foreign Application Priority Data
May 16, 2014    (JP) .................. 2014-102341

(51) Int. Cl.
*C10M 107/38* (2006.01)
*F16C 33/20* (2006.01)
(Continued)

(52) U.S. Cl.
CPC ............. *C10M 107/38* (2013.01); *B05D 1/02* (2013.01); *B05D 1/30* (2013.01); *C10M 125/02* (2013.01); *C10M 149/18* (2013.01); *F16C 33/20* (2013.01); *F16C 33/201* (2013.01); *F16C 33/206* (2013.01); *C10M 2201/041* (2013.01); *C10M 2213/023* (2013.01); *C10M 2217/044* (2013.01);
(Continued)

(58) Field of Classification Search
CPC ...... C10M 2201/041; C10M 2213/023; C10M 2217/044; F16C 33/20
USPC ........................................................ 508/106
See application file for complete search history.

(56) References Cited

U.S. PATENT DOCUMENTS

2003/0148128 A1*  8/2003  Tomaru .................... G11B 5/73
                                                                                        428/480
2004/0259741 A1   12/2004  Sugioka et al.
(Continued)

FOREIGN PATENT DOCUMENTS

AT          505226 A1    11/2008
CN         101839188 A    9/2010
(Continued)

OTHER PUBLICATIONS

International Search Report for Patent Application No. PCT/JP2015/063026 dated Aug. 4, 2015 (5 pages).
(Continued)

*Primary Examiner* — Vishal V Vasisth
(74) *Attorney, Agent, or Firm* — Harness, Dickey & Pierce, P.L.C.

(57) ABSTRACT

A sliding member having a coating film and a method for forming a coating film, which can realize both of improvement in lubricity of the coating film by using a solid lubricant and improvement in adhesiveness of the coating film to a ground, and a method for forming a coating film.

8 Claims, 1 Drawing Sheet

(51) Int. Cl.
  *B05D 1/02* (2006.01)
  *B05D 1/30* (2006.01)
  *C10M 125/02* (2006.01)
  *C10M 149/18* (2006.01)

(52) U.S. Cl.
  CPC ...... *F16C 2202/52* (2013.01); *F16C 2208/02* (2013.01); *F16C 2208/42* (2013.01); *F16C 2300/02* (2013.01)

(56) References Cited

U.S. PATENT DOCUMENTS

| | | |
|---|---|---|
| 2005/0257684 A1 | 11/2005 | Sugiura et al. |
| 2007/0225177 A1 | 9/2007 | Murase et al. |
| 2008/0159671 A1 | 7/2008 | Leonardelli |
| 2008/0194437 A1* | 8/2008 | Murase .................... C09D 7/62 508/108 |
| 2010/0236516 A1 | 9/2010 | Sasaki |
| 2011/0045309 A1 | 2/2011 | Reusmann et al. |
| 2012/0222646 A1 | 9/2012 | Sasaki |
| 2013/0337271 A1 | 12/2013 | Yoshikawa et al. |
| 2015/0210888 A1 | 7/2015 | Goto |
| 2018/0327633 A1 | 11/2018 | Goto |

FOREIGN PATENT DOCUMENTS

| | | |
|---|---|---|
| EP | 1489152 A2 | 12/2004 |
| EP | 1892429 A2 | 2/2008 |
| EP | 2677021 A1 | 12/2013 |
| JP | H07-189804 A | 7/1995 |
| JP | H08-183137 A | 7/1996 |
| JP | H10-246149 A | 9/1998 |
| JP | 2002327874 A * | 11/2002 |
| JP | 2005146366 | 6/2005 |
| JP | 2005-337129 A | 12/2005 |
| JP | 2007031501 | 2/2007 |
| JP | 2008-039185 A | 2/2008 |
| JP | 2008180138 | 8/2008 |
| JP | 2010-216362 A | 9/2010 |
| JP | 2011-513674 A | 4/2011 |
| JP | 2013234219 | 11/2013 |
| WO | H06-047760 A | 2/1994 |
| WO | WO-2014/042144 A1 | 3/2014 |

OTHER PUBLICATIONS

Written Opinion for Patent Application No. PCT/JP2015/063026 dated Aug. 4, 2015 (12 pages).
Extended European Search Report for Patent Application No. EP 15791918.4 dated Dec. 15, 2017 (7 pages).
First Chinese Office Action for Patent Application No. CN 201580026584.2 dated Dec. 8, 2017 (10 pages).
Second Chinese Office Action for Patent Application No. CN 201580026584.2 dated Aug. 7, 2018 (8 pages).
Japanese Office Action for Patent Application No. JP 2016-519210 dated Feb. 18, 2019 (6 pages).
Chinese Rejection Decision for Patent Application No. CN 201580026584.2 dated Feb. 14, 2019 (9 pages).
Japanese Office Action for Patent Application No. JP 2016-519210 dated Jun. 24, 2019 with English translation (7 pages).
European Office Action for Patent Application No. EP 15791918.4 dated Aug. 22, 2019 (4 pages).
Intention to grant under Rule 71(3) EPC dated Mar. 27, 2020 in the corresponding EP Application No. 15791918.4; (32 total pages).

* cited by examiner

SLIDING MEMBER HAVING COATING FILM AND METHOD FOR FORMING COATING FILM

This application is a 371 of PCT/JP2015/063026, filed Apr. 30, 2015.

FIELD OF THE INVENTIONS

The present invention relates to a sliding member having a coating film and a method for forming a coating film, more specifically to a sliding member having a coating film and a method for forming a coating film which realizes both of lubricity of the coating film by using a solid lubricant and adhesiveness of the coating film to the ground by inclining a concentration of the solid lubricant in the coating film (gradient coating), and realizes simplification of the process.

BACKGROUND OF THE INVENTIONS

It has heretofore been disclosed in Patent Document 1 a composition for a sliding member in which polyamide-imide resin, polyamide resin, polyimide resin, epoxy resin or phenol resin is used as the binder resin, and further fluorinated polymer such as polytetrafluoroethylene (PTFE), etc.; molybdenum disulfide or tungsten disulfide is used as the solid lubricant. A technique which uses graphite as the solid lubricant has been disclosed in Patent Document 2.

However, to give lubricity to the coating film by using the solid lubricant is inconsistent with adhesiveness of the coating film to the ground, and there is a problem that lubricity is to be improved, then, adhesiveness is necessarily lowered.

When a formulation ratio of the solid lubricant is a little, lubricity is not sufficient and it is not suitable as a composition for a sliding member. To the contrary, when a formulation ratio of the solid lubricant is large, adhesiveness is lowered, and in particular, at the high load region, the coating film is easily peeled off from the ground.

Depending on the uses, it has been attempted to establish the function by optimizing the amounts of these solid lubricants to take a balance between adhesiveness and lubricity, or to improve adhesiveness by modifying the ground using a primer treatment. However, in the former, there is a limit to be consistent, and in the latter, remarkable improvement in adhesiveness cannot be expected.

To the contrary, in Patent Document 3, it has been attempted to establish the function by markedly improve lubricity by using silicone oil, but there is a problem that adhesiveness of the coating film is lowered by using the liquid lubricant.

In Patent Document 4, PAI (polyamide-imide) is baked at a lower layer, and PAI using a solid lubricant is coated thereon, but the following problems are involved.
(1) A drying process is necessary. A process must be added, so that it takes a cost as compared with the wet-on-wet coating.
(2) The layers are completely separated between the lower layer and the upper layer, so that adhesiveness between the layers is lowered, or the solid lubricant is not contained in the lower layer portion, so that the upper layer is worn away then sliding property is lost.
(3) There is no benefit by mixing due to compatibility of the upper layer and the lower layer.
(4) When PAI is used in the lower layer alone in the wet-on-wet coating, difference in shrinkage between the lower layer and the upper layer is large, so that crack is easily generated at the coated surface.

PRIOR ART DOCUMENTS

Patent Documents

Patent Document 1: JP-A-2007-031501
Patent Document 2: JP-A-2008-180138
Patent Document 3: JP-A-2013-234219
Patent Document 4: JP-A-2005-146366

SUMMARY

Thus, the first object of the present invention is to provide a sliding member having a coating film, which can realize both of improvement in lubricity of the coating film by using a solid lubricant, and improvement in adhesiveness of the coating film to the ground.

In addition, the second object of the present invention is to provide a sliding member having a coating film, which can realize both of improvement in lubricity of the coating film by using a solid lubricant(s), and improvement in adhesiveness of the coating film to the ground, and to provide a method for forming a coating film which can realize simplification of the process.

Also, the other objects of the present invention become clear by the following descriptions.

Means for Solving Problem

The above-mentioned problems are solved by the following respective inventions.

1. A sliding member having a coating film which comprises a plural number of coating film layers onto a surface of the sliding member using a composition for a sliding member containing at least a binder resin and a solid lubricant(s), and a concentration of the solid lubricant(s) in the coating film layer at a side far from the surface of the sliding member is higher than a concentration of the solid lubricant(s) in coating film layer at a side near to the surface of the sliding member.

2. The sliding member having a coating film according to 1, wherein the plural number of coating film layers is two layers, and a concentration of the solid lubricant(s) in an upper layer of the two-layer coating film layers is higher than a concentration of the solid lubricant(s) in a lower layer.

3. The sliding member having a coating film according to 1 or 2, wherein components of compositions for a sliding member used for the plural number of the coating film layers are the same.

4. A method for forming a coating film which comprises coating a composition for a sliding member (1) containing at least a binder resin and a solid lubricant(s) onto a sliding member to form a first coating film layer, then, coating a composition for a sliding member (2) containing at least a binder resin and a solid lubricant(s) onto the first coating film layer without drying the first coating film layer to form a second coating film layer, and then, drying these to form a coating film, wherein an amount X of the solid lubricant(s) in the composition for a sliding member (1) of the first coating film layer is in a range of 5 wt % to 35 wt %, an amount Y of the solid lubricant(s) in the composition for a sliding member (2) of the second coating film layer is in a range of 35 wt % to 65 wt %, and a total value (X+Y) of the amounts of the solid lubricants contained in the composition for a sliding member (1) and the composition for a sliding member (2) is 85 or less.

5. The method for forming a coating film according to 4, wherein components of the compositions for a sliding member used for the first coating film layer and the second coating film layer are the same.

6. A sliding member having a coating film which is obtained by the method for forming a coating film according to 4 or 5.

Effect of the Invention

According to the present invention, a sliding member having a coating film which can realize both of improvement in lubricity of the coating film by using a solid lubricant(s) and improvement in adhesiveness of the coating film to the ground can be provided.

Also, according to the present invention, a method for forming a coating film which can provide a sliding member having a coating film which can realize both of improvement in lubricity of the coating film by using a solid lubricant(s) and improvement in adhesiveness of the coating film to the ground, and can realize simplification of the process can be provided.

DETAILED DESCRIPTION OF THE INVENTIONS

Figure 1:
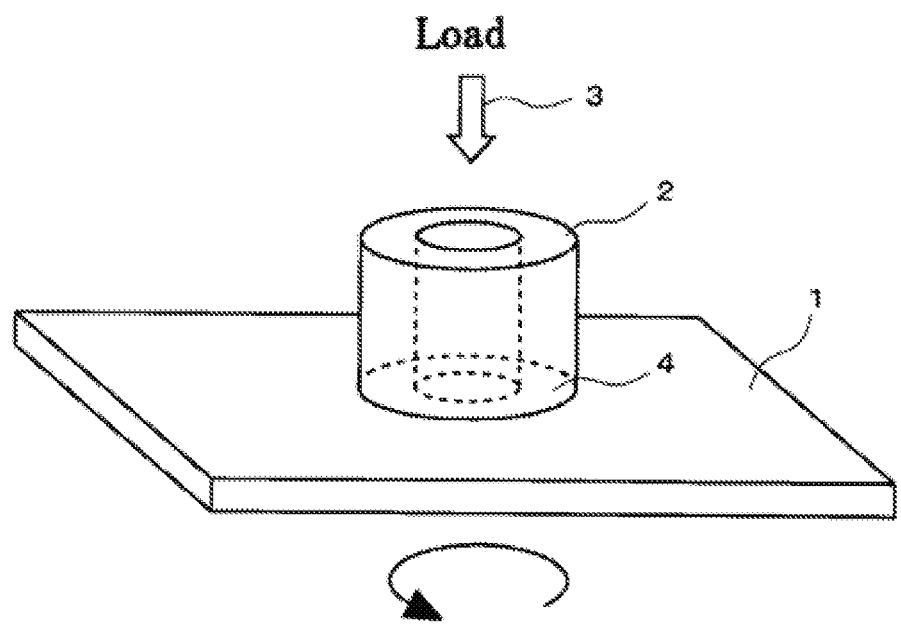
FIG. 1 is a drawing showing a testing apparatus.

In the following, the embodiments of the present invention are explained.

<Sliding Member Having Coating Film>

The sliding member having a coating film of the present invention comprises a plural number of coating film layers formed onto a surface of a sliding member using a composition for a sliding member which contains at least a binder resin and a solid lubricant(s), and a concentration of the solid lubricant(s) in the coating film layer at the side far from the surface of the sliding member is higher than a concentration of the solid lubricant(s) in the coating film layer at the side near to the surface of the sliding member.

The composition for a sliding member contains at least a binder resin and a solid lubricant(s).

The binder resin is not particularly limited, and may be exemplified by, for example, polyamide-imide resin (PAI), polyamide resin (PA), polyimide resin (PI), epoxy resin and phenol resin, and one kind may be used by selecting from the above, or two or more kinds thereof may be used in combination.

The solid lubricant is not particularly limited, and may be exemplified by, for example, fluorine-containing polymer selected from polytetrafluoroethylene (PTFE), tetrafluoroethylene-perfluoroalkyl vinyl ether copolymer, tetrafluoroethylene-hexafluoropropylene copolymer, tetrafluoroethylene-ethylene copolymer, polyvinylidene fluoride and polychlorotrifluoroethylene; metal disulfide selected from molybdenum disulfide and tungsten disulfide; and graphite, and one kind may be used by selecting from the above, or two or more kinds thereof may be used in combination.

The sliding member having a coating film of the present invention has a constitution that a plural number of coating film layers are formed onto the surface of the sliding member using a composition(s) for a sliding member.

The present invention has a characteristic in the point that a concentration of the solid lubricant(s) in the coating film layer at the side far from the surface of the sliding member is higher than a concentration of the solid lubricant(s) in the coating film layer at the side near to the surface of the sliding member.

It is preferred that the plural number of the coating film layers are two layers, and a concentration of the solid lubricant(s) in the upper layer of the two-layered coating film layers is higher than a concentration of the solid lubricant(s) in the lower layer of the same.

That is, lubricity is improved since the concentration of the solid lubricant(s) of the coating film layer (the outermost surface layer which becomes a sliding surface; the upper layer) at the side far from the sliding member is high.

On the other hand, a concentration of the coating film layer at the side near to the sliding member is low, i.e., the concentration of the solid lubricant(s) is low at the interface between the coating film layer and the sliding member (the ground) so that the coating film and the ground are firmly adhered.

In the present invention, both of improvement in lubricity of the coating film and improvement in adhesiveness of the coating film to the ground have been realized by the difference (due to set up of the concentration gradient) in the concentrations of the solid lubricant(s) to be used.

In the present invention, it is preferred that the compositions for a sliding member to be used for a plural number of the coating film layers are the same components. Here, the same components mean that the compositions and the compounds constituting the compositions for a sliding member are the same. For example, if the resins selected as the binder resin are the same, these are the same components. Also, if the substances (compounds) selected as the solid lubricant(s) are the same, these are the same components. When other additives are contained, if substances (compounds) to be used as the additive(s) are the same, these are the same components.

When the compositions for a sliding member to be used for a plural number of the coating film layers are the same components, the following effects can be exhibited. When two-layered coating film layers are formed, for example, peeling of the films between the upper layer and the lower layer can be prevented. With regard to this peeling of the films, when the wet-on-wet coating mentioned later is employed, the upper layer and the lower layer are the same components and yet there is no interface, so that peeling of the films between the upper layer and the lower layer can be further prevented.

Also, when the compositions for a sliding member to be used for a plural number of the coating film layers have compatibility with each other, if the wet-on-wet coating mentioned later is employed, the interface between the upper layer and the lower layer can be eliminated, so that peeling of the films between the upper layer and the lower layer can be prevented.

<Film Forming Method>

The method for forming a coating film of the present invention is suitable as a means for forming a coating film in the above-mentioned sliding member having a coating film.

Specifically, the method for forming a coating film of the present invention is incorporating a means of providing a concentration gradient of the solid lubricant(s) in a plural number of coating films, and a means of employing the wet-on-wet coating when a plural number of coating films are formed.

First, a composition for a sliding member (1) containing at least a binder resin and a solid lubricant(s) is coated onto a sliding member to form a first coating film layer.

Next, a composition for a sliding member (2) containing at least a binder resin and a solid lubricant(s) is coated onto the first coating film layer without drying the first coating film layer to form a second coating film layer, and then, dried to form a coating film.

Here, the terms "without drying" mean a wet-on-wet coating, and no compulsory drying process is carried out after coating the lower layer and before coating the upper layer. By allowing the lower layer to stand after its coating, it may be naturally dried in some cases, but such natural drying is not included in the compulsory drying process herein mentioned.

Specific constitution of the concentration gradient is that a formulation ratio X of the solid lubricant(s) in the composition for a sliding member (1) of the first coating film layer is in the range of 5 wt % to 35 wt %, a formulation ratio Y of the solid lubricant(s) in the composition for a sliding member (2) of the second coating film layer is in the range of 35 wt % to 65 wt %, and a total value (X+Y) of the formulation ratio of the solid lubricant(s) contained in the composition for a sliding member (1) and the composition for a sliding member (2) is 85 or less.

If the total value (X+Y) of the formulation ratio exceeds 85, fracture of the coating film is generated.

The definition of the concentration mentioned above is to show that a concentration of the solid lubricant(s) in the coating film is inclined to increase toward the outside (toward the upper layer from the lower layer).

The wet-on-wet coating does not enter the drying process between the first coating film layer (the lower layer) coating and the second coating film layer (the upper layer) coating, so that the lower layer and the upper layer are mixed with each other at the interface thereof, delamination of the coating films between the lower layer and the upper layer can be prevented, and there is a merit that the equipment at the time of mass production can be simplified.

When two-layered constitution is employed by wet-on-wet coating of the compositions for a sliding member, the compositions for a sliding member with the same components are preferably coated. The upper layer and the lower layer are the same components and yet the interface can be eliminated, so that peeling of the films between the upper layer and the lower layer can be further prevented. The meaning of the same components herein mentioned is the same as the contents defined in the above explanation of the invention regarding the sliding member having a coating film.

When the compositions for a sliding member to be used for a plural number of the coating film layers have compatibility with each other, the interface between the upper layer and the lower layer can be eliminated since the wet-on-wet coating is employed, so that there is an effect that peeling of the films between the upper layer and the lower layer can be prevented.

The binder resin or the solid lubricant to be used for the composition for a sliding member may be used the above-mentioned resin.

With regard to an amount of the binder resin, an amount the binder resin to be used in the composition of the upper layer is preferably in the range of 30% to 65% by weight, and an amount the binder resin to be used in the composition of the lower layer is preferably in the range of 65% to 95% by weight.

The composition for a sliding member to be used in the method for forming a coating film of the present invention may contain a solvent to improve coating property. The solvent is not particularly limited, and may be mentioned N-methyl-2-pyrrolidone, N,N-dimethylformamide, xylene, methyl ethyl ketone and methyl isobutyl ketone. These solvents may be used singly, or two or more kinds in combination.

The composition for a sliding member may further contain a colorant, a defoaming agent, a surfactant or other additives within the range which does not impair the objects of the present invention. These additives may be used singly, or two or more kinds in combination.

The composition for a sliding member can be used by formulating predetermined amounts of the binder resin, the solid lubricant(s), the other additive(s) and the solvent, and mixing and dispersing these components using a stirrer such as a dissolver, or a ball mill, a sand mill, an agihomomixer, or optionally in combination thereof.

<Coating Method of Composition>

The composition for a sliding member is coated onto the sliding member, a plural number of the coating film layers are formed onto the surface of the sliding member, whereby the sliding member having a coating film can be obtained.

The coating method to the sliding member is not particularly limited, and may be mentioned, for example, a spraying method, a dipping method, a flow coating method, a dispenser method and a spin coating method, preferably a spraying method. Depending on the respective coating methods, a viscosity of the coating composition can be adjusted by using a solvent at the time of producing the same or before coating.

After coating and forming the first coating film layer, the second coating film layer is coated thereon without drying, and then, drying and baking are carried out. Thus, a multi-layered coating film is formed onto the surface of the sliding member.

Drying is carried out at a temperature of 60° C. to 120° C.

A baking temperature when the film is baking after drying is preferably 150° C. to 300° C., more preferably 180° C. to 250° C.

A film thickness of the whole layers after baking is preferably 10 μm to 80 μm, more preferably 20 μm to 40 μm.

After baking, the sliding member is cooled, and may be adjusted by polishing depending on the purposes.

The technique of the present invention can be utilized for a compressor or an engine piston of an air conditioner, an internal combustion engine, a sliding bearing, a chain, an electromagnetic valve of a gas or a liquid, a plunger, a valve or the like.

EXAMPLES

In the following, Examples of the present invention are explained. The present invention is not limited by such Examples.

Example 1

[Preparation of Composition for Sliding Member]
1. Composition for Lower Layer
(1) Binder resin: Polyamide-imide (PAI) resin ("HPC-5012" available from Hitachi Chemical Co., Ltd.); 60 parts by weight (2) Solid lubricant:
Polytetrafluoroethylene (PTFE) ("Fluon L173J" available from Asahi Glass Co., Ltd.); 40 parts by weight
Graphite ("HOP" available from Nippon Graphite Industries, Ltd.) 2 parts by weight
(3) Solvent: A mixed solvent of N-methyl-2-pyrrolidone and methyl isobutyl ketone 2. Composition for Upper Layer
(1) Binder resin: Polyamide-imide (PAI) resin ("HPC-5012" available from Hitachi Chemical Co., Ltd.); 90 parts by weight
(2) Solid lubricant:
Polytetrafluoroethylene (PTFE) ("Fluon L173J" available from Asahi Glass Co., Ltd.); 10 parts by weight
Graphite ("HOP" available from Nippon Graphite Industries, Ltd.); 2 parts by weight
(3) Solvent: A mixed solvent of N-methyl-2-pyrrolidone and methyl isobutyl ketone The above-mentioned composition for a lower layer is prepared, and a compositional paint sufficiently mixed and dispersed by a ball mill is coated onto a sliding member test piece (Material; A6061 disc) by spray to form a lower layer.

The compositional paint at the lower layer side was so coated that the film thickness after baking became 12 to 18 μm.

Then, without subjecting to drying, a compositional paint at the upper layer side was so coated that the film thickness after baking became 12 μm to 18 μm. It was baked at 200° C. to 230° C. in matching with the binder. The total film thickness was made 25 μm to 35 μm.

A sliding member having a coating film (a disc having a coating film) for tests was obtained as mentioned above.

[Evaluation]
1. Friction Wear Characteristics:

It was evaluated by using a Suzuki-type friction wear testing machine ("EFM-III-EN" manufactured by Orientec Co., Ltd.).

The mating ring material comprising a material of aluminum (A6061) with a size having an outer diameter φ 25.6 mm, an inner diameter φ 20 mm and a height of 40 mm was used. The ring was so polished that it has a roughness Rz [DIN] within the range of 1.0±0.5 μm.

The test method is so carried out that, as shown in FIG. 1, first, a ring 2 is set on a test sliding surface 4 of a sliding member having a coating film (a disc having a coating film) 1 for the test.

According to Test condition 1 shown in the following Table 1, a load 3 is applied to the ring from upward, and a side of the disc 1 is rotated with a peripheral speed of 120 mm/s. The test was carried out for 10 hours, a wear depth of the disc sliding surface 4 after the test was evaluated as a wear amount, and the results were shown in Table 3.

TABLE 1

(Test condition 1)

| | Test conditions |
|---|---|
| Lubrication | Drying state |
| Load | 1500N |
| Speed | 120 mm/s |
| Time | 10 hours |

2. Adhesiveness

It was evaluated by a ball on disc test using a surface property tester TYPE: 14FW (manufactured by Shinto Scientific Co., Ltd.). The mating ball material comprising a material of SUS304 with a size of φ 5 mm ball was used.

Figure 2:
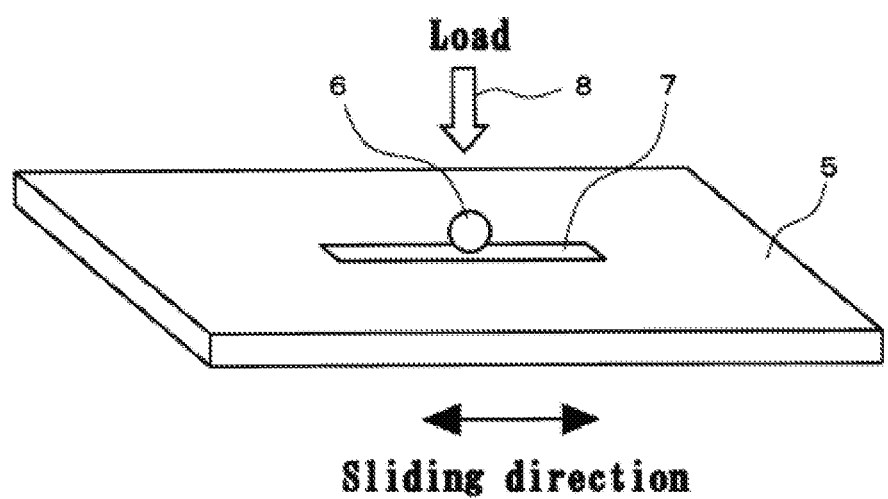
FIG. 2 is a drawing showing a testing apparatus.

The test method is so carried out that, as shown in FIG. 2, first, a ball 6 is set on a test sliding portion 7 of a sliding member having a coating film (a disc having a coating film) 5 for the test.

According to Test condition 2 shown in the following Table 2, a load 8 is applied to the ball from upward, and the ball is reciprocally slid with a width of 10 mm and a speed of 40 mm/s for 400 times.

After the test, the state of the coating film at the slid surface was observed, and the presence or absence of peeling (fracture) was observed, which was evaluated as adhesiveness, and the results were shown in Table 3.

TABLE 2

(Test condition 2)

| | Test conditions |
|---|---|
| Lubrication | Drying state |
| Load | 9.8N |
| Speed | 40 mm/s |
| Number of Times | 400 times |

Examples 2 to 4

In the same manner as in Example 1 except for changing the amounts of the components of the composition for the lower layer and the composition for the upper layer as shown in Table 3 without changing the components thereof, 2-layered coating film layer was formed to obtain sliding members having a coating film (a disc having a coating film) for the tests, evaluated in the same manner as mentioned above, and the results were shown in Table 3.

Comparative Examples 1 to 6

In the same manner as in Example 1 except for using the composition for the upper layer as shown in Table 3, a single-layered coating film was formed to obtain sliding members having a coating film (a disc having a coating film) for the tests, evaluated in the same manner as mentioned above, and the results were shown in Table 3.

Comparative Example 7

In the same manner as in Example 1 except for changing the amounts of the components of the composition for the lower layer and the composition for the upper layer as shown in Table 3 without changing the components thereof, a sliding member having a coating film (a disc having a coating film) for the tests, onto which a 2-layered coating film layer had been formed, was obtained, evaluated in the same manner as mentioned above, and the results were shown in Table 3.

TABLE 3

| | | | Example 1 | Example 2 | Example 3 | Example 4 | Comparative example 1 | Comparative example 2 | Comparative example 3 | Comparative example 4 | Comparative example 5 | Comparative example 6 | (Parts by weight) Comparative example 7 |
|---|---|---|---|---|---|---|---|---|---|---|---|---|---|
| Coating film layer composition | Upper layer | PAI resin | 60 | 60 | 40 | 40 | 90 | 80 | 70 | 60 | 50 | 40 | 40 |
| | | PTFE | 40 | 40 | 60 | 60 | 10 | 20 | 30 | 40 | 50 | 60 | 60 |
| | | Graphite | 2 | 2 | 2 | 2 | 2 | 2 | 2 | 2 | 2 | 2 | 2 |
| | Lower layer | PAI resin | 90 | 70 | 90 | 80 | | | Single layer | | | | 70 |
| | | PTFE | 10 | 30 | 10 | 20 | | | | | | | 30 |
| | | Graphite | 2 | 2 | 2 | 2 | | | | | | | 2 |
| | Solid lubricant amount in total (upper layer + lower layer) | | 54 | 74 | 74 | 84 | | | | | | | 94 |
| Characteristics test results | Friction wear characteristics Evaluation: Wear depth (μm) | | 0.9 | 1.0 | 0.3 | 0.4 | Over torque | Over torque | 4.0 | 1.1 | 0.3 | 2.1 | 1.5 |
| | Adhesiveness Evaluation: Presence or absence of fracture | | None | None | None | None | None | None | None | Present | Present | Present | Present |

It can be understood from Examples 1 to 4 that both of lubricity and adhesiveness can be improved by making the concentration of the solid lubricant in the coating film layer at the side far from the surface of the sliding member higher than the concentration of the solid lubricant in the coating film layer at the side near to the surface of the sliding member (by inclining the concentration of the composition).

It can be understood from Comparative examples 1 to 3 that the friction coefficient becomes large and wear is also large since the ratio of the solid lubricant is a little, whereas adhesiveness is good.

In Comparative examples 4 to 6, fracture of the coating film is generated since the ratio of the solid lubricant is much, whereas wear resistance is good.

In Comparative example 7, fracture of the coating film is generated since the total ratio of the solid lubricants in the upper layer and the lower layer is much, whereas the friction coefficient and the wear amount are good.

I claim:

1. A sliding member having a coating film which comprises a plural number of coating film layers onto a surface of the sliding member using a composition for a sliding member containing at least a binder resin and a solid lubricant,
   wherein the plural number of coating film layers is two layers, and a concentration of the solid lubricant in an upper layer of the two-layer coating film layers located distal from the sliding member is higher than a concentration of the solid lubricant in a lower layer of the two-layer coating film layers located proximate the sliding member,
   each of the coating film layers contain the same components,
   polyamide-imide resin is used as the binder resin,
   polytetrafluoroethylene and graphite are used as the solid lubricant in combination,
   an amount X of the solid lubricant in the composition of the lower layer is in a range of 5 wt % to 35 wt %,
   an amount of the binder resin in the composition of the lower layer is in a range of 65 wt % to 95 wt %, and
   an interface between the upper layer and the lower layer is not present.

2. A film forming method which comprises:
   coating a composition containing at least polyamide-imide resin as a binder resin and polytetrafluoroethylene and graphite as solid lubricants onto a sliding member to form a first coating film layer,
   coating a composition containing at least polyamide-imide resin as a binder resin and polytetrafluoroethylene and graphite as solid lubricants onto the first coating film layer without drying the first coating film layer to any extent to form a second coating film layer, and then drying these to form a coating film, wherein an amount X of the solid lubricant in the composition of the first coating film layer is in a range of 5 wt % to 35 wt %, an amount Y of the solid lubricant in the composition of the second coating film layer is in a range of 35 wt % to 65 wt %, a total value (X+Y) of the amounts of the solid lubricant is 85 or less, an amount of the binder resin in the composition of the first coating film layer is in a range of 65 wt % to 95 wt %, and an amount of the binder resin in the composition of the second coating film layer is in a range of 30 wt % to 65 wt %,
   wherein components of the compositions for a sliding member used for the first coating film layer and the second coating film layer are the same.

3. A sliding member having a coating film, which is obtained by the method for forming a coating film according to claim 2.

4. The sliding member having a coating film according to claim 1, wherein the amount X of the solid lubricant in the composition of the lower layer is in a range of 5 wt % to 31.4 wt %.

5. The sliding member having a coating film according to claim 1, wherein an amount of Y of the solid lubricant in the composition of the upper layer is in a range of 35 wt % to 65 wt %, and an amount of the binder resin in the composition of the upper layer is in a range of 30 wt % to 65 wt %.

6. The sliding member having a coating film according to claim 5, wherein a total value (X+Y) of the amounts of the solid lubricant is 85 wt % or less.

7. The sliding member having a coating film according to claim 1, wherein the composition for the sliding member further contains a solvent selected from the group consisting of N-methyl-2-pyrrolidone, N, N-dimethylformamide, and xylene.

8. The method for forming a coating film according to claim 2, wherein the compositions further contain a solvent selected from the group consisting of N-methyl-2-pyrrolidone, N, N-dimethylformamide, and xylene.

* * * * *